June 8, 1965 S. D. HEMPHILL ETAL 3,188,619

JAM DETECTOR FOR CARD FEEDING DEVICE

Filed Sept. 4, 1959 3 Sheets-Sheet 1

INVENTORS
SYLVESTER D. HEMPHILL
ORI EVEN-TOV

William G. Miller Jr.
AGENT

INVENTOR.
SYLVESTER D. HEMPHILL
ORI EVEN-TOV
William G. Miller Jr.
AGENT

JAM DETECTOR FOR CARD FEEDING DEVICE

Filed Sept. 4, 1959 3 Sheets-Sheet 3

| | CARDS IN | CARDS OUT | INPUT COUNTER 94 | INPUT COUNTER 62 | OUTPUT COUNTER 100 | OUTPUT COUNTER 80 | FUNCTION TABLE SIGNALS 81 | 82 | 96 | 98 | 181 | 182 | 186 | 188 | 190 | 192 | 194 |
|---|---|---|---|---|---|---|---|---|---|---|---|---|---|---|---|---|---|
| A | 0 | 0 | 0 | 0 | 0 | 0 | 0 | $+V_2$ | 0 | $+V_2$ | 0 | $+V_2$ | 0 | $+V_2$ | 0 | $+V_2$ | 0 |
| B | 1 | 0 | 0 | 1 | 0 | 0 | $+V_2$ | 0 | 0 | $+V_2$ | 0 | $+V_2$ | 0 | $+V_2$ | $+V_2$ | 0 | $+V_2$ |
| C | 2 | 0 | 1 | 0 | 0 | 0 | 0 | $+V_2$ | $+V_2$ | 0 | 0 | $+V_2$ | 0 | $+V_2$ | $+V_2$ | 0 | $+V_2$ |
| D | 3 | 0 | 1 | 1 | 0 | 0 | $+V_2$ | 0 | $+V_2$ | 0 | 0 | $+V_2$ | 0 | $+V_2$ | $+V_2$ | 0 | $+V_2$ |
| E | 4 | 1 | 0 | 0 | 0 | 1 | 0 | $+V_2$ | 0 | $+V_2$ | $+V_2$ | 0 | 0 | $+V_2$ | $+V_2$ | 0 | $+V_2$ |
| F | 5 | 2 | 0 | 1 | 1 | 0 | $+V_2$ | 0 | 0 | $+V_2$ | 0 | $+V_2$ | $+V_2$ | 0 | $+V_2$ | 0 | $+V_2$ |
| G | 6 | 2 | 1 | 0 | 1 | 0 | 0 | $+V_2$ | $+V_2$ | 0 | 0 | $+V_2$ | $+V_2$ | 0 | $+V_2$ | 0 | $+V_2$ |

Fig. 2

INVENTOR.
SYLVESTER D. HEMPHILL
ORI EVEN-TOV
BY
William G. Miller Jr.
AGENT

United States Patent Office
3,188,619
Patented June 8, 1965

3,188,619

JAM DETECTOR FOR CARD FEEDING DEVICE

Sylvester David Hemphill and Ori Even-Tov, Philadelphia, Pa., assignors to Sperry Rand Corporation, New York, N.Y., a corporation of Delaware Filed Sept. 4, 1959, Ser. No. 838,308
8 Claims. (Cl. 340—259)

This invention relates to means for detecting a "jam" condition in a device for sequentially feeding punched cards or similar items. More particularly, this invention is concerned with a "jam" of the type which would occur as a result of feeding more cards into a specific area of a card processing unit, as between two particular points in the feed line, than are being fed out of the same area.

It is an object of this invention to provide an improved means for detecting an excessive number of items between an input point and an output point of a feed device.

Another object of this invention is the provision of an improved "jam" detection circuit for a card-feeding device.

Still another object of this invention is the provision of a circuit for detecting a predetermined difference between the number of cards entering a particular area of a feed device and the number of cards leaving that area.

Still another object of this invention is an improved means for counting the number of cards fed into a card-processing device and the number of cards being fed out and comparing these counts to determine the presence of an excess number of cards between the input and output points.

In accordance with this invention, there is provided a first and second counting means each producing separate signals representing the number of cards passing a first and second point, respectively; and means responsive to a comparison of the separate signals for detecting the presence of more than a predetermined number of cards between the two points.

Figure 1A:
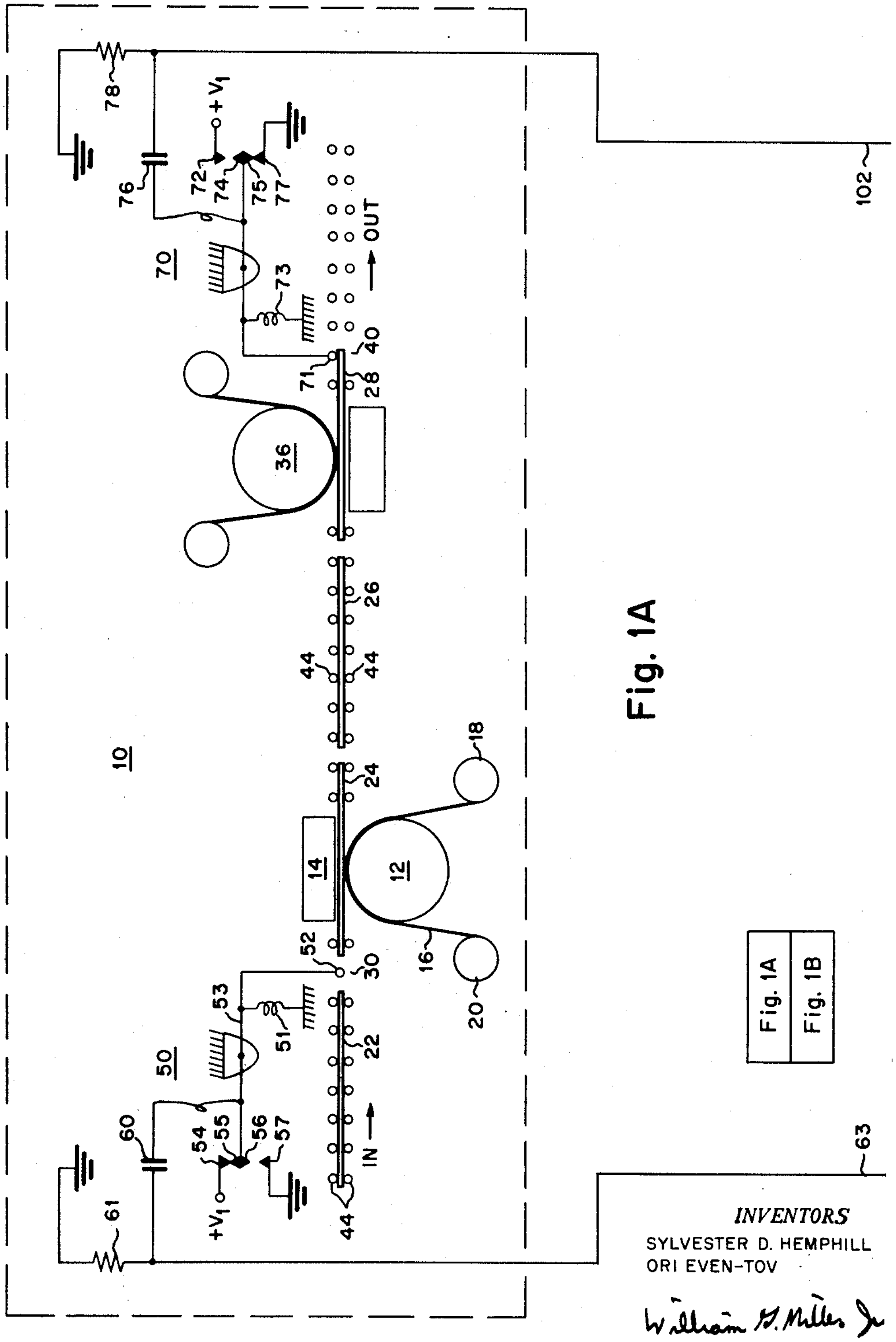
Figure 1B:
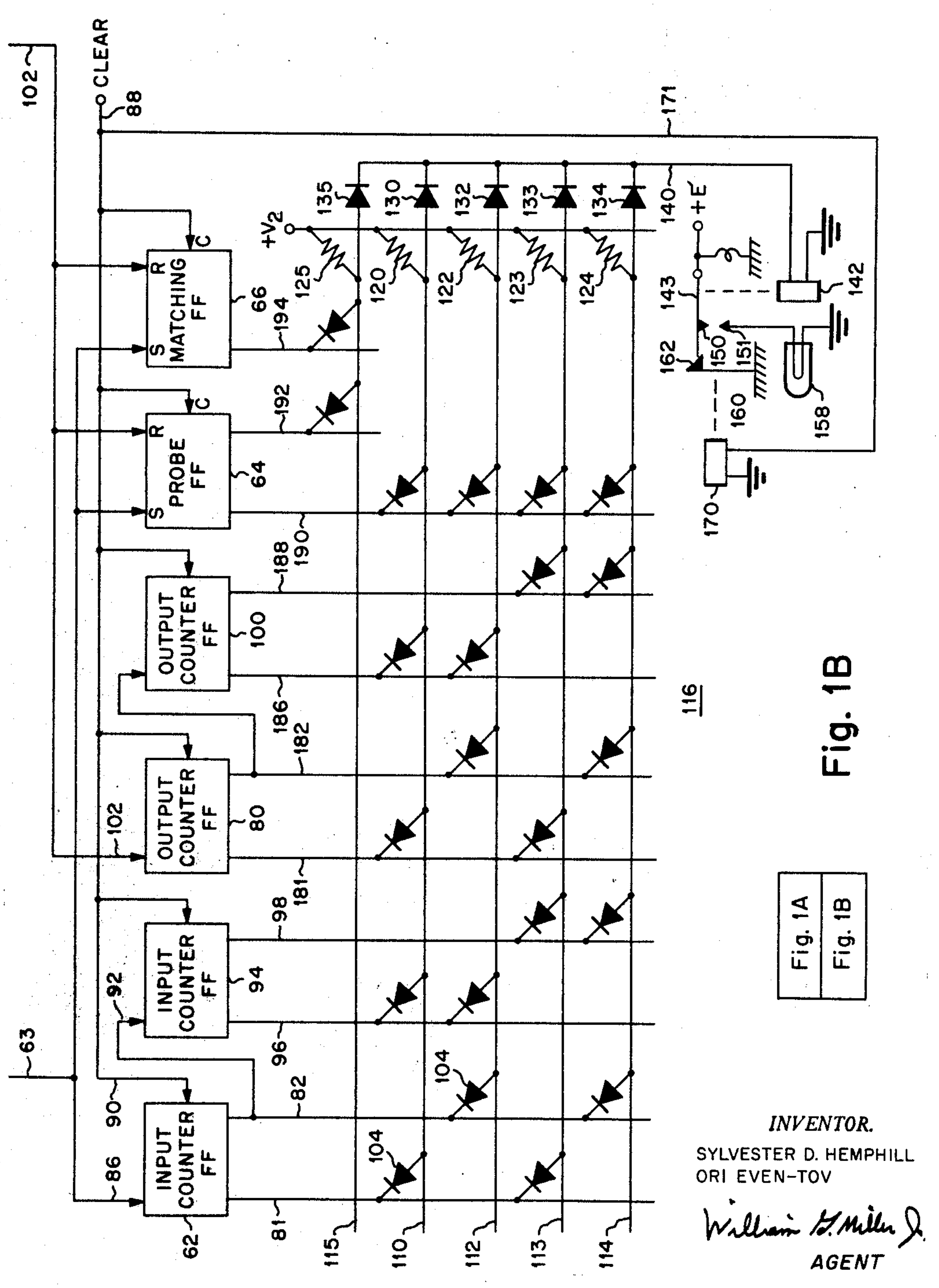

The foregoing and other advantages, objects, and novel features of this invention, as well as the invention itself as to its organization and mode of operation, may be best understood from the following description when read in connection with the accompanying drawings in which:

FIGURES 1A and 1B together are a diagrammatic illustration of the embodiment of this invention in a card feed device.

FIGURE 2 is a table showing the potentials existing at the outputs of the counters during successive stages of the feeding operation of FIGURE 1.

One embodiment of this invention is shown in FIGURES 1A and 1B which when joined together illustrate the application of this invention to a card processing device 10 which includes separate card printing stations for printing data on both sides of the cards being fed through the device. A printer suitable for this purpose is described in an article "A Self-Checking High-Speed Printer" by Masterson et al. in Proceedings of the Eastern Joint Computer Conference, December 1954. The card printing stations consist of a constantly rotating type drum 12 such as one having type characters located along axial lines spaced about the periphery of the drum. The type characters for any particular letter or number will be the same for the full length of each axial line along the drum periphery, and the desired characters can be printed in the desired positions on the under side of the card by selective actuation of separate hammers in the actuator unit 14. These actuators are aligned with the axis of the drum 12 and each is capable of selectively causing the particular character opposite an actuator at any time to be printed on the under side of the card in the positions of the actuator. This printing operation is effected by means of inked ribbon 16 which has a width corresponding to the axial length of the drum 12 and which constantly traverses the under side of the card by means of a feed mechanism including rollers 18 and 20.

The cards such as 22, 24, 26 and 28 are constantly fed from left to right along the feed line during operation. The cards, therefore, are moved sequentially past input point 30, the first printing unit including drum 12, a second printing unit (similar to the first printing unit) including drum 36 and output point 40 by the feed rollers 44, which are constantly driven by a motor (not shown).

The feed rollers are positioned for contacting the cards both on the under side as well as the top, and these rollers are regularly distributed along the length of the feed path between the input point 30 and the output point 40 to maintain a constant feed of cards between those points.

A switch 50 is utilized at the input point 30 to detect the passage of a card past that point. This switch includes the roller 52 connected to pivoted lever 53 which carries contacts 55 and 56. In the absence of a card under roller 52, the stationary contact 54 is held in contact with the movable contact 55 by spring 51. The contact 54 is connected to a source of positive voltage $V_1$. When contacts 54 and 55 are "made" or are in contact, the positive voltage $V_1$ is then connected to a pulse forming circuit including capacitor 60 and resistor 61 which are serially connected between the $+V_1$ supply and ground. When a card is under roller 52, the contacts 56 and 57 are "made." The capacitor 60 is then in a discharge circuit including resistor 61, contact 56 and grounded contact 57.

The junction between resistor 61 and capacitor 60 is connected to the input of counting flip-flop 62 and to the "set" input of the probe flip-flop 64 as well as the "set" input of the similar matching flip-flop 66.

A switch 70, similar to switch 50, is provided for detecting the passage of cards past the output point 40. This switch connects a source $+V_1$ upon the "making" of its stationary contact 72 and its movable contact 74 by spring 73 to a pulse forming circuit including capacitor 76 and resistor 78 in series. When a card is under roller 71, contact 75 and grounded contact 77 are made to provide a discharge path for capacitor 76 through resistor 78. The junction between capacitor 76 and resistor 78 is connected in turn to the input of counting flip-flop 80 and to the "reset" inputs of flip-flops 64 and 66. Flip-flops 64 and 66 are, for example, of the bistable multivibrator type which produce a positive potential $+V_2$ only on their output lines 190 and 194 in response to a set input at "S". A set input, for example, is a positive-going pulse produced upon charging of the capacitor at the trailing edge of a card. The negative pulse produced during discharge of the capacitor 60 at the leading edge of a card does not affect the flip-flops 64, 66. The potential $+V_2$ is produced on line 192 in response to a reset input pulse at "R". The reset input pulse at "R" of the matching flip-flop 66 causes the flip-flop 66 to be reset. However, in that the reset output of the flip-flop is not employed in the instant device no reset line for the matching flip-flop 66 is shown. The reset input pulse at "R" of the matching flipflops 66 will cause the set output line 194 to produce a zero potential output. The reset pulse is likewise positive-going produced upon discharge of the capacitor 76 at the trailing edge of a card. Flip-flops 64 and 66 are reset by the application of a "Clear" pulse input at "C" which causes the production of a $+U_2$ potential on line 192. Any of the well known flip-flop circuits with these characteristics may be used.

The flip-flop 62 provides outputs of potential $+V_2$ at lines 81 and 82 alternately in response to consecutive positive-going input pulses from line 86 and is thus a modulo-2 or single-stage binary counter. Flip-flop 62 also receives a "clear" input from terminal 88 through line 90. Upon receiving the clear input from line 90, flip-flop 62 causes output line 81 to go to zero potential while output line 82 goes to potential $+V_2$. A subsequent input pulse from line 86 would cause flip-flop 62 to change its state and thus produce an output $+V_2$ on output line 81 and an output of zero potential on line 82. Each subsequent input pulse received on line 86 will serve to alternate the potentials of the output lines 81 and 82, thus flip-flop 62 is a binary counter. Any of the well known binary counter circuits having the characteristic mentioned above may be used as flip-flops 62, 94, 80 and 100.

Line 82 is connected through line 92 to the input of flip-flop 94. Flip-flop 94 is similar to flip-flop 62 and will thus present potentials on the output lines 96 and 98 which will respectively alternate between a potential $+V_2$ and zero as previously explained with regard to flip-flop 62. Flip-flop 62 then, in combination with flip-flop 94, combine to form a two-stage binary counter which will count the consecutive passage of cards into the card-feed device 10. The flip-flops 80 and 100 are similar to flip-flops 62 and 94 except that the flip-flops 80 and 100 form a two-stage binary counter responsive to pulses produced by actuation of the output switch 70 which pulses appear on input line 102.

The output lines 81, 82, 96, 98, 181, 182, 186, 188, 190, 192, and 194 from the several flip-flops 62, 94, 80, 100, 64, and 66 are connected by way of diodes 104 to selected ones of lines 110, 112, 113, 114, and 115 forming function table 116. The output lines are connected to the cathode side of these diodes. Each of the lines 110, 112, 113, 114, and 115 are connected through corresponding resistors 120, 122, 123, 124, and 125 to a source of positive potential $V_2$. These lines are connected to the anodes of diodes 130, 132, 133, 134, and 135 respectively. A buffer circuit is formed by connection of the common line 140 to the cathodes of these diodes. Line 140 in turn is connected through the "jam" relay actuation coil 142 to ground. The diodes 104 are so connected that the "jam" relay actuation coil 142 is energized by flow of current from the source $+V_2$ through one of the resistors 120, 122, 123, 124 or 125 only if the corresponding one of the lines 110–115 is at potential $V_2$. This condition occurs when all of the vertical output lines 81, 82, 96, 98, 181, 182, 186, 188, 190, 192, 194, which are connected through the diodes 104 to that particular one of the horizontal lines 110, 112, 113, 114 or 115 are at a potential $+V_2$.

Coil 142 upon energization by way of line 140 moves the relay armature 143 causing the associated contact 150 and stationary contact 151 to "make" thus connecting the source of potential +E which is connected to armature 143 through the indicator bulb 158 to ground. Simultaneously, the actuation of the solenoid 142 and the resulting motion of the armature 143 causes a mechanical latch comprising a flexible leaf spring 160 and attached pawl 162 to engage the actuated armature 143 and maintain contact between the contacts 150 and 151 until the mechanical latch is released. The releasing of the mechanical latch is accomplished by the "clear" signal from terminal 88 which is fed to solenoid 170 via line 171. The energization of solenoid 170 will serve to remove the holding element 162 from its latched position and release the armature 143 which will then be returned to a position in which the contacts 150 and 151 will be disengaged.

In operation of the embodiment of FIGURE 1, trailing edges of the cards passing the input point 30 and the output point 40 produce positive-going pulses that are counted. The input count is obtained by the two-stage binary counter comprising flip-flops 62 and 94 which is capable of counting in the binary system up to three cards before resetting to zero. The input count is represented by the potentials on lines 81, 82, 96 and 98 with the least significant digit being represented by the potential on lines 81, 82 and the other digit on lines 96, 98. The output count is similarly obtained by the two-stage binary counter comprising flip-flops 80 and 100 which count in similar fashion to 62 and 94 and represent the card output count by the potentials on lines 181, 182, 186, and 188.

In addition to the input and output count, probe flip-flop 64 is set each time a card is fed in and is reset each time a card is fed out. The matching flip-flop 66 is provided so that it can be compared to flip-flop 64 to indicate when flip-flop 64 has failed to be set when a card is fed in. If flip-flop 64 should remain reset due to some failure, that condition plus the set condition of flip-flop 66 produces a potential of $+V_2$, which energizes "jam" relay coil 142 to indicate the failure.

The function table 116 serves to provide an output to the "jam" relay solenoid 142 whenever the binary input count and the binary output count as obtained by respective counters are the same (except for the condition of zero cards in the print station area; this zero condition is, of course, not a "jam").

In general, it is necessary that the function table connection be such that a "jam" is indicated whenever there are cards in the print station area and the input count and the output count show equal residues when dividing the counts by a modulus corresponding to the number of cards which produce a "jam" condition. The condition of no cards between the input and output is not a "jam" condition, and is indicated as such.

In the example of FIGURES 1A and 1B, if four cards are considered to produce a "jam" condition, then since the two-stage binary counters (62, 94 and 80, 100) counting the input and output have, when taken as complete counters, four stable states, it is only necessary to detect congruence between the counts (except for the case of no cards in the print station area) in order to obtain an indication of a "jam" condition in the area between the input and output points 30 and 40, respectively.

A particular sequence of events which will produce a "jam" condition in the card processing unit 10 will now be described. Reference is made to FIGURE 2 which shows the different registered counts at different stages of card feeding and the associated potentials at the flip-flop outputs.

Before starting the card processing apparatus 10, a clear pulse is sent from terminal 88 to clear flip-flops 62, 94, 80, 100, 64 and 66 and to unlatch "jam" relay armature 143 by the energization of solenoid 170. The clear condition corresponds to a zero card input and will produce the potentials at the output lines of the several flip-flops in accordance with a line A of FIGURE 2. The zero potentials on lines 190 and 194 ensure that all of the lines 110–115 are at zero potential to prevent actuation of the "jam" relay 142. Upon initiation of the card feeding operation, the first card 28 passes the input point 30 and in so doing lifts roller 52 of switch 50 which in turn disconnects the normally "made" contacts 54 and 55 of the input circuit 50 and makes contacts 56 and 57 to discharge capacitor 60 until the trailing edge of card 28 has passed the roller 52. At that time, contacts 54, 55 are again "made." This making of the contacts 54, 55 connects the potential source $+V_1$ through capacitor 60 and resistor 61 to ground thereby producing during the charging of capacitor 60 a pulse on line 63 and at input 86 of flip-flop 62. This input to flip-flop 62 will, as is shown in line B of FIGURE 2, serve to produce a change in the potentials on the flip-flop output lines 81 and 82. The passage of the trailing edge of the second card 26 past the roller 52 will likewise create a similar input pulse to flip-flop 62 which will change the potential of the input lines 81 and 82 of flip-flop 62 and in so doing also produce an input on line 92 to flip-flop 94 and thus change the potentials of the output lines 96 and 98 of flip-flop 94, as is shown in line C of FIGURE 2. This counting operation continues upon the passage of the trailing edge of card 24 past the roller 52 whereupon the potentials of the output lines 81, 82, 94 and 96 takes on the values shown in line D of FIGURE 2. The input switch 50 has then counted the input of three cards to the card processing unit 10. Assuming that three is the maximum number of cards which can be tolerated in the feed line between the input point 30 and the output point 40, it is desirable that a "jam" condition be indicated only whenever a greater number of cards are present between the input point 30 and the output point 40. Assuming normal operation of the card feeding rollers 44, the passage of card 22 past the input point 30 and roller 52 will be accompanied by passage of the card 28 past the output point 40 and the roller 71 of the associated output switch. Thus, the input switch 50 sends another input pulse to flip-flop 62 and the output switch 70 at about the same time sends the first input pulse to flip-flop 80 by way of line 102. After these pulses have been received by the respective flip-flops 62 and 80, (registering counts of 4 cards in and 1 out), the potentials on the output lines are as shown on line E of FIGURE 2. The passage of the first card subsequent to card 22 past the input point 30 and the passage of card 26 past the output point 40 (registering counts of 5 cards in and 2 out) similarly produces input pulses to the respective flip-flops 62 and 80 causing the corresponding output lines of function table signals to be as shown on line F of FIGURE 2.

Assuming there is then faulty operation of the card feed device, such as failure of card 24 to be properly transported by the roller 44, the next card passing the input point 30, namely, the sixth card, generates an input signal to flip-flop 62 but the trailing edge of card 24 does not pass the output point 40 thus keeping the output card count at 2. It is desirable to indicate a "jam" condition in such a situation since there will then be four cards between input point 30 and output point 40. The potential which will be produced on the output lines of the several flip-flops to provide the function table signals under such a faulty operating condition are shown in line G of FIGURE 2. In this case, it will be noted that the potentials on the output lines 81, 82, 96, 98, 181, 182, 186, and 188 indicate input and output counts which are the same. These particular counts, namely, the binary 10 produces a zero potential on output lines 81, 98, 181, and 188 and a $+V_2$ potential on lines 82, 96, 182 and 186. Examination of the function table 116 shows that these potentials prevent current flow through the diodes 104 connecting line 112 to the lines 82, 96, 182 and 186 and, as the potential of line 190 is likewise at $+V_2$, current flow from the potential source $+V_2$ occurs through resistor 122 and through diode 132 and likewise through the energizing solenoid 142 to ground. The energization of solenoid 142 then in turn actuates the armature 143 making contact between the contacts 150 and 151. This contact is maintained by the mechanical latch arrangement including leaf spring member 160 and pawl 162. The making of contacts 150 and 151 causes current flow from the +E potential source through the indicating lamp 158 to ground, thus indicating a "jam" condition.

If the "jam" condition occurs when the counts registered in the input counter 62, 94 and in the output counter 80, 100 are each "2," line 112 rises to $+V_2$ potential; if at a count of "3," line 110 rises to $+V_2$; if at a count of "1," line 113 rises to $+V_2$; and if at a count of "0," line 114 rises to $+V_2$.

The potential of the line 190 after each card passes the input point 30 will be $+V_2$ as shown in FIGURE 2. In FIGURE 2, the potentials of the lines 190, 192, and 194 are all indicated as the potentials existing when the flip-flops are set, namely, after the passage of a card past the input point 30 and prior to passage of a subsequent card by the output point 40. It is only at these times (immediately after a card is fed in) that line 190 is at $+V_2$; thus, it is only at these times that lines 110–114 can rise to $+V_2$ and energize the relay coil 142. At other times immediately after a card is fed out, the probe flip-flop 64 is reset, which causes line 190 to go to zero potential thus preventing a "jam" condition from being indicated by lines 110–114. Therefore, if the feed of cards should be such that all cards are transported from the region between the input and output point no "jam" will be indicated even though the input and output counts may be congruent.

Initially, before the first card is fed in, line 115 is at zero potential because flip-flop 66 is reset (cleared) and line 194 is at zero potential. After a card is fed in, flip-flop 64 is set and line 192 is at zero potential to maintain line 115 at zero potential.

The flip-flop 66 is connected to receive the same inputs as flip-flop 64 and serves to produce an output on line 194 which normally is the opposite of the output on line 192. Therefore, if flip-flop 64 fails to change state upon receipt of a set pulse as from the input switch 50, the potential on line 194 and that on line 192 would both be $+V_2$ and would, therefore, allow current flow from the $+V_2$ source through resistor 125 and diode 135 to "jam" relay solenoid 142 causing indication of the "jam" condition.

While a particular "jam" condition which produces a current flow through resistor 122 has been illustrated in FIGURE 2, it will be evident that congruency between the possible binary counts from the input switch 50 and the output switch 70 usually will cause a "jam" to be indicated for under such a condition the flip-flop output lines which are connected through diodes 104 to one of the horizontal lines of the function table, namely, 110, 112, 113, or 114, are all at $+V_2$ providing a card has entered the area between the switches since the last card left the area.

Function tables of different orientations than that of 116 and counters of types different than the two-stage binary counters shown in FIGURE 1B can be used in a similar fashion to that described above to indicate the existence of an excess number of items such as cards between an input point and an output point on a feed line in order to provide an indication of a "jam" condition which would normally require intervention by an operator to correct faulty operation and clear the feed device for further operation. The invention described above can obviously be used for other types of devices in which a sequential feed of individual items between an input and an output point are to be monitored in order to indicate possible failure of the feeding apparatus. However, the device has particular use in the card processing units presently used in computing apparatus and data reduction operations where the feeding rate is very high and detection of failure as soon as possible is imperative.

What is claimed is:

1. In a card feed device, a jam detector for indicating the presence of a certain number of cards between a first and second point in the line of feed comprising first and second means each producing a separate count signal, said count signals based on a modulus corresponding to said certain number and indicative of the number of cards passing said first and second points respectively, and means for detecting congruence between said count signals and operative to indicate a jam condition when congruence is detected.

2. A jam detector for a card feeding device comprising input switch means producing a signal in response to the passage of a card past an input point of said feeding device, output switch means producing a signal in response to passage of a card past an output point displaced from said input point, an input counter for producing an input count signal by cyclically counting said signal from said input switch means in accordance with a certain number base, an output counter for producing as output count signal by cyclically counting said signals from said output switch means in accordance with said number base, and function table means for producing an output in response to coincidence between said input count signal and said output count signal.

3. A jam detector for a card feeding device comprising input switch means producing a signal in response to the passage of a card past an input point of said feeding device, output switch means producing a signal in response to the passage of a card past an output point displace from said input point, a first and second binary counter each having interconnected flip-flops forming the separate stages, means connecting said first counter to receive signals from said input switch means, means connecting said second counter to receive signals from said output switch means, function table means connected to said first and second counters for producing an output in response to coincidence between the output of the first counter and the output of said second counter, and a probe flip-flop connected to said function table and responsive to signals from said input and said output switch means, said probe flip-flop being connected to said function table in a manner to prevent the production of said function table output during the period following a signal from said output switch means and prior to a subsequent signal from said input switch means.

4. A jam detector for a card feeding device comprising an input switch operable to produce a signal in response to the passage of a card past an input point of a said device, an output switch operable to produce a signal in response to a passage of a card past an output point of said device, said output point being displaced from said input point, an input counter and an output counter each having a first and second flip-flop interconnected to form a two-stage binary counter for producing potentials on four output lines indicative of the number of cards passing said input point and said output point respectively, a function table interconnecting said output lines of said flip-flops to a source of potential whereby selective ones of said output lines form a current path for said source of potential whenever said input counter and said output counter have corresponding outputs therefrom, means connecting said source of potential to a said relay whereby said relay is energized by said source of potential to produce an indication of a jam condition unless a current path is formed by said output lines and said function table to shunt said relay.

5. In a card feed device, means for detecting the presence of a certain number of cards between two points along the line of feed comprising first and second counting means for producing signals indicative of the count of cards passing a first and second of said points respectively, said counts being based on a modulus corresponding to said certain number, means for detecting a congruence between said counts, and means responsive to the existence of congruence as detected by said last named means for indicating that said certain number of cards are between said two points.

6. A jam detector for a card feed device comprising an input switch operable to produce a first signal in response to passage of a card past an input point of said device, an output switch operable to produce a second signal in response to passage of a card past an output point of said device, said output point being spaced along the line of feed from said input point, input and output count means for increasing the potential on selected ones of a plurality of input and output count lines respectively to a certain value, the distribution of said certain valued potential among said input and output count lines being respectively indicative of the count of said first and second signals means for detecting a similar distribution of said certain valued potential on said input count lines as compared with those on said output count lines, said means for detecting including a plurality of detecting lines each coupled in unilateral current carrying relationship between another source of potential at least equal to said certain valued potential and like individual combinations of said input and output count lines representing similar distributions of said certain valued potentials and indicative of congruence between said input and output counts, means operable upon cessation of unilateral current flow between said input and output count lines and one of said detecting lines in response to a similar distribution of said certain valued potential to said input count lines and said output count lines to indicate a jam condition.

7. Apparatus for monitoring the passage of articles along a single line through a machine for rapidly indicating a hold-up in the feeding of articles through the machine, said apparatus comprising first and second detectors positioned along the line of movement of the articles and spaced apart along the line a distance equal to at least the spacing between two adjacent ones of the articles and with the distance being such that a predetermined number of the articles are located between said detectors during the normal movement of the articles along the line, first and second electronic counters, said detectors being connected to respective ones of said counters for actuating said counters in response to the passage of articles past said detectors, and signal means connected to and operated by said counters when the count of said first counter exceeds the count of said second counter by a number in excess of said predetermined number.

8. Apparatus for monitoring the passage of articles through a machine, comprising a first and second detector device both arranged for actuation by the passage of articles through the machine and spaced from each other by a distance such that a predetermined number of articles are located therebetween during the continuity of article feeding, a first and a second electronic counter respectively connected to said first and second detector devices for actuation thereby when articles are detected by the detector devices, said counters each having the same radix and being so arranged that a predetermined relation is maintained between the counts thereof during continuity of article feeding, and comparing means connected to the counters and operable to produce an output signal when the relation between the counts is other than said predetermined relation thereby to give an indication that there is a hold-up of articles in the areas of the detector devices in that the number of articles between the detector devices is different from said predetermined number.

References Cited by the Examiner

UNITED STATES PATENTS

| | | | |
|---|---|---|---|
| 2,448,830 | 9/48 | Robbins. | |
| 2,528,790 | 11/50 | Scherer | 340—51 |
| 2,677,815 | 5/54 | Brustman. | |
| 2,701,301 | 2/55 | Mullarkey | 246—247 |

NEIL C. READ, *Primary Examiner.*

BENNETT G. MILLER, ROBERT H. ROSE, *Examiners.*